United States Patent [19]

Mitchell et al.

[11] 4,031,266
[45] June 21, 1977

[54] RECONSTITUTABLE TOMATO BEVERAGE COMPOSITIONS

[75] Inventors: William A. Mitchell, Lincoln Park, N.J.; William C. Seidel, Monsey, N.Y.

[73] Assignee: General Foods Corporation, White Plains, N.Y.

[22] Filed: Nov. 26, 1975

[21] Appl. No.: 635,469

Related U.S. Application Data

[63] Continuation of Ser. No. 442,721, Feb. 14, 1974, abandoned, which is a continuation of Ser. No. 306,248, Nov. 13, 1972, abandoned, which is a continuation-in-part of Ser. No. 167,019, July 28, 1971, abandoned.

[52] U.S. Cl. .............................. 426/599; 426/661; 426/464
[51] Int. Cl.$^2$ ......................................... A23L 2/10
[58] Field of Search .......... 426/590, 599, 661, 618, 426/626, 640, 456, 464, 465, 473, 518, 463, 471

[56] References Cited

UNITED STATES PATENTS

| | | | |
|---|---|---|---|
| 2,392,241 | 1/1946 | Glabe | 426/589 |
| 2,854,343 | 9/1958 | Strashun | 426/599 |
| 3,117,878 | 1/1964 | Anderson | 426/61 |
| 3,197,312 | 7/1965 | Eolkin | 426/473 |
| 3,431,119 | 3/1969 | Griffon | 426/661 |
| 3,579,341 | 5/1971 | Trubiano | 426/549 |
| 3,748,151 | 7/1973 | Szmanski | 426/599 |

OTHER PUBLICATIONS

Hackh's Chemical Dictionary, 4th Ed. McGraw-Hill, N.Y., 1961, p. 111.

*Primary Examiner*—Hiram H. Bernstein
*Attorney, Agent, or Firm*—Daniel J. Donovan; Bruno P. Struzzi

[57] ABSTRACT

Dehydrated reconstitutable tomato beverage compositions are prepared by forming an aqueous admixture of tomato solids and gelatinizable starch materials, the starch materials to water ratio in the admixture being such that limited rupture of the starch granules occurs, whereupon the admixture is drum dried and ground to produce a powder which, upon rehydration, gives tomato beverages of viscosity, texture and taste comparable to conventional non-dehydrated tomato beverages.

5 Claims, No Drawings

RECONSTITUTABLE TOMATO BEVERAGE COMPOSITIONS

BACKGROUND OF THE INVENTION

This is a continuation of application Ser. No. 442,721, filed Feb. 14, 1974 and now abandoned which in turn is a continuation of application Ser. No. 306,248 filed Nov. 13, 1972 and now abandoned which is a Continuation-in-Part of Ser. No. 167,019 filed July 28, 1971 and now abandoned.

FIELD OF THE INVENTION

This invention relates to the novel production of dehydrated reconstitutable tomato beverages such as tomato juice, tomato sauce, ketchup and other tomato beverage derivatives; more specifically, the invention relates to processing means adapted to confer viscosities texture and flavor characteristics commonly asociated with conventional tomato beverage to the reconstituted products. Among the advantages obtained from these dehydrated tomato products are reduced transportation rates, different and less costly packaging materials and the use of a lesser quantity of packaging materials for the same value of the product to the consumer.

DESCRIPTION OF THE PRIOR ART

Many attempts have been made to obtain dehydrated tomato compositions which, upon rehydration, produced a beverage comparable in characteristics to conventional tomato beverages. However, the problems encountered were the inability to reproduce conventional tomato beverage flavors because of undue "hay-like" flavors remnant from prior processes; poor rehydration abilities; failure to simulate conventional tomato beverage viscosities; inadequate shelf or storage life. The problem was further complicated due to the apparent inability to obtain conventional tomato beverage textures or mouthfeel and to secure lack of settling and proper hydration of the pulpy particles.

An especially notable prior art attempt to obtain reconstitutable dehydrated tomato beverage compositions utilized dried tomato flakes or crystals as the base. However, these failed to rehydrate in a manner to provide a crushed tomato or pulp-like texture and also developed hay-like flavor notes which were unacceptable. Dry blending other additives such as gums partially resolved the problem, as these beneficially affected viscosity and body; however, such gums failed insofar as inducing typical tomato beverage texture and particle appearance. Moreover, the use of known synthetic tomato flavors and enhancers was similarly ineffective in attempting to mask undesirable hay flavors or in contributing good tomato flavor notes.

SUMMARY OF THE INVENTION

Novel means have been devised by applications for procuring dehydrated reconstitutable tomato beverage compositions. Thus, by drum drying an aqueous admixture of tomato solids and gelatinizable starch materials where the starch material to water ratio is such that limited rupture of the starch granules occurs, and grinding the admixture into a powder of suitable dimensions, a tomato beverage characteristic of conventional tomato beverage is produced upon reconstitution with water.

The powdery tomato beverage compositions produced according to applicants' process may be utilized as a base composition to which other ingredients such as flavor, sugar, food salts, food acids and other food materials may be added in minor proportions.

The particular method of subdividing or grinding the dehydrated admixture is not critical, as long as the grinding technique for a particular admixture is one which generates insufficient heat to prevent scorching. In general, however, the particle size of the ground particles can be chosen so that upon rehydration the most desired texture for a tomato product can be obtained.

The tomato solids may be in the form of a dilute solution or dispersion of solids such as tomato juice, a more concentrated solution such as tomato paste, and other like solutions or dispersions.

The principle object of the invention is to provide dehydrated tomato beverage compositions which are reconstitutable.

Another object is to provide processes for producing tomato beverage compositions characterized by viscosities, taste, textures and the general appearance of conventional tomato beverages upon reconstitution.

Other objects and advantages of the invention will become apparent in the description and examples hereinafter appearing.

DETAILED DESCRIPTION OF THE INVENTION

The manner for producing dehydrated tomato beverage compositions utilizes gelatinizable starch materials with a solution of tomato solids and essentially entails employing dextrins, potato starch, tapioca starch, and flour or, stated differently and more generally, both pure and modified starches and combinations thereof. If the gelatinizable starch material selected tends to have an off or cardboard-like flavor after the drum drying process, this undesirable flavor may be eliminated by adjusting the pH of an aqueous suspension of the starch material between 6.5 and 7.5 with alkali such as sodium hydroxide.

A critical feature of this invention is that the amount of starch materials added to the solution or dispersion of tomato solids is such that the ratio of the starch materials to water in the admixture results in limited rupture of the starch granules during the drum drying step. This feature is critical, since it is found that if too much water is present in the admixture of tomato solids and starch materials, substantial rupture of the starch granules will occur. This rupture results in a thin-bodied texture and viscosity being conferred to the reconstituted beverage. However, if the starch materials to water ratio is maintained such that limited rupture occurs, a swelling phenomenon is predominant during drying, thus conferring a thicker, more natural-like texture and viscosity to the reconstituted beverage.

The above-mentioned starch to water ratio in the aqueous admixture to be dried may vary according to the particular starch materials employed, and more importantly, the desired end product upon reconstitution. An important feature of this invention is that the process affords excellent control over the desired viscosity and texture of the reconstituted end product by varying the amounts of starch used in preparing the aqueous admixture. Thus, if the end product is to be tomato juice, less starch will be required in the aqueous admixture than if tomato sauce is the desired final product.

In general, the gelatinizable starch materials to water ratio in the admixture of the starch materials with a solution of tomato solids sent to the drum-dryer will be in the range of 1:9 to 4:1 parts of starch to parts of water and preferably in the range of about 1:4 to 3:2. Upper limits on the amount of starch materials added to the solution of tomato solids are dictated primarily by such factors as provide a sufficiently flowable admixture for transportation to the particular drum drying apparatus.

The following examples will serve to more fully illustrate the present invention.

EXAMPLE I

| Base Admixture | Percent by Weight |
|---|---|
| Dextrin | 5.5 |
| Tomato Paste* | 42.3 |
| Potato Starch | 9.9 |
| Water | 42.3 |
| | 100.0 |

*Tomato paste having 46% solids

Dextrin is suspended in a small quantity of water and adjusted to pH 6.8 with a mild solution of NaOH. This suspension along with tomato paste and potato starch is mixed with the remainder of water to form a thick slurry. The slurry is fed at such a rate into a pinched 2 foot drum drier heated to between 130° C – 150° C by about 40 p.s.i. of steam with the drums rotating at about 3 r.p.m. that a dried product is obtained. The dried product is removed by normal doctor blade and ground to pass through a 100 U.S. mesh screen.

About 55 parts by weight of the drum dried tomato base is added to about 45 parts of the following additive ingredients:

| Ingredients | Percent by Weight |
|---|---|
| Sugar | 56.5 |
| Salt | 22.7 |
| Monosodium Glutamate | 7.6 |
| Citric Acid | 6.6 |
| Ascorbic Acid | 0.8 |
| Sodium dihydrogenphosphate | 4.2 |
| Tricalcium phosphate | 1.6 |
| | 100.0 |

Approximately 1 part of the dried tomato base-ingredient mixture is reconstituted with stirring in about 15 parts by weight of water to produce a tomato juice beverage having viscosity, texture and flavor substantially comparable to conventional undried tomato juice.

EXAMPLE II

Same as Example I, except that tomato paste and an equal weight of water was employed. The paste was very difficult to drum dry and the dried powder agglomerated excessively both before and after grinding. The powder upon attempted reconstitution produced unsatisfactory viscosity, unacceptable texture, and possessed a hay-like flavor and taste.

EXAMPLE III

| Base Admixture | Percent by Weight |
|---|---|
| Dextrin | 2.8 |
| Potato Starch | 2.8 |
| Tomato Paste | 21.7 |
| Water | 72.7 |
| | 100.0 |

The dextrin was adjusted to pH 7.0 with NaOH, and the material of the base is slurried as in Example I, however, instead of drum drying the base is spray dried in a Niro spray dryer at about 150° C. Following a similar admixture with the additive ingredients of Example I, a good flavored tomato beverage is produced upon reconstitution, however, it was not as dispersible as the dehydrated product of Example I and the pulpy materials settled or precipitated faster than conventional tomato solids.

As demonstrated in the three foregoing examples, drum drying is the means of drying that produces the best dehydrated reconstitutable tomato beverage composition when a gelatinizable starch material is employed along with a solution of tomato solids. Preferred drying temperatures for the drum drying process are from about 120° C to 150° C. In all cases, the drying temperature should be sufficiently low to avoid scorching and ultimately the concomitant hay-like flavor note.

The admixture of gelatinizable starch materials and tomato solids may optionally include other ingredients such as gums to provide a more pronounced thickening effect.

It is understood that the examples are exemplary and not restrictive, and that other variations and additives may be made without detracting from the invention ambit.

What is claimed is:

1. A process for producing a dehydrated reconstitutable tomato beverage composition characterized by viscosities, taste, textures, and the general appearance of conventional tomato beverages upon reconstitution, comprising placing a starch material in an aqueous slurry and adjusting the slurry to a pH of about 6.5 to 7.5, forming an aqueous admixture of said slurry, tomato solids and a different gelatinizable starch material, drum drying said admixture at temperatures from about 120° C to 150° C, fine grinding the same to a fine powder which will pass through a 100 U.S. mesh screen, the ratio of said starch material to water in said admixture being such that limited rupture of the starch material occurs during drying, said ratios being from about 1:9 to 4:1 parts starch to parts water, said pH adjustment effective to reduce off flavor in the dehydrated tomato beverage.

2. The process of claim 1 wherein the starch material is a dextrin and wherein the different starch material is potato or tapioca starch.

3. The process of claim 1 wherein the starch material is a dextrin and wherein the different starch material is flour.

4. The process of claim 1 in which the ratio of parts of gelatinizable starch to parts water is 1:4 to 3:2.

5. The product prepared by the process of claim 1.